United States Patent [19]

Deacon et al.

[11] Patent Number: 4,601,938

[45] Date of Patent: Jul. 22, 1986

[54] ARTICLE SUITABLE FOR WIPING SURFACES

[75] Inventors: Martin J. Deacon, Rushden; Geoffrey Forrest, Wellingborough; Gavin B. Rowe, Ringstead, all of England

[73] Assignee: Lever Brothers Company, New York, N.Y.

[21] Appl. No.: 385,193

[22] Filed: Jun. 4, 1982

[30] Foreign Application Priority Data

Jun. 18, 1981 [GB] United Kingdom ................. 8118803

[51] Int. Cl.[4] ................................................ B32B 3/00

[52] U.S. Cl. ................................. 428/153; 15/104.93; 428/156; 428/171; 428/195; 428/211; 428/219; 428/340; 428/484; 428/485; 428/486

[58] Field of Search ............... 428/195, 205, 211, 221, 428/189, 190, 191, 163, 165, 167, 169, 171, 172, 486, 484, 152, 153, 485, 913, 156, 219, 340; 427/278, 286, 288, 363, 365, 366, 394, 354, 353, 428, 9; 15/104.93

[56] References Cited

U.S. PATENT DOCUMENTS

| | | | |
|---|---|---|---|
| D. 259,219 | 5/1981 | Bates et al. . | |
| 1,947,135 | 2/1934 | Moorhead . | |
| 3,047,444 | 7/1962 | Harwood . | |
| 3,293,683 | 12/1966 | Wyant . | |
| 3,846,158 | 11/1974 | Vasilyadis . | |
| 3,965,518 | 6/1976 | Muoio | 428/198 |
| 3,965,519 | 6/1976 | Hermann | 15/104.93 |
| 4,145,464 | 3/1979 | McConnell et al. . | |
| 4,154,883 | 5/1979 | Elias . | |
| 4,259,383 | 3/1981 | Eggensperger . | |
| 4,353,480 | 10/1982 | McFadyen | 221/63 |
| 4,426,418 | 1/1984 | Coleman et al. | 15/104.93 |

FOREIGN PATENT DOCUMENTS

| | | |
|---|---|---|
| 6709 | 6/1979 | European Pat. Off. . |
| 2625176 | 8/1977 | Fed. Rep. of Germany . |
| 2917133 | 6/1980 | Fed. Rep. of Germany . |
| 1403935 | 8/1975 | United Kingdom . |
| 1428435 | 3/1976 | United Kingdom . |
| 1577470 | 10/1980 | United Kingdom . |
| 2066661 | 7/1981 | United Kingdom . |

*Primary Examiner*—James J. Bell
*Attorney, Agent, or Firm*—Milton L. Honig; James J. Farrell

[57] ABSTRACT

In an article suitable for wiping surfaces which comprises an elongate web substrate impregnated with a liquid composition, migration of the liquid along the length of the substrate is substantially prevented by dividing the substrate into a plurality of individual areas by means of a repeating pattern of liquid-repellent barrier material, for example, wax or certain resins, extending across the whole width of the substrate. This measure prevents fluid loss by capillary action and evaporation when the wet substrate is stored in a dispenser. The wet substrate is preferably used in conjunction with a dispenser having a relatively tight closure, especially one in which the closure is formed by two resilient diaphragms with out-of-register apertures. The wet substrate delivery system may be used, for example, for hand hygiene in hospitals, washrooms or kitchens.

13 Claims, 12 Drawing Figures

ARTICLE SUITABLE FOR WIPING SURFACES

The present invention relates to articles suitable for wiping surfaces, which articles are in the form of wet impregnated substrates suitable for continuous dispensing from a dispenser. Such impregnated substrates may be used for many purposes, for example, hand and face cleaning, skin treatment other than cleaning (e.g. anti-acne treatment), baby hygiene, cleaning of industrial and domestic surfaces (e.g. windows, paintwork, machinery). The impregnating liquid may be, but is not necessarily, water-based. Dispensers of such articles may be relatively small, portable items or they may be fixtures, for example, in hospital wards, washrooms, factories, workshops or kitchens.

The invention is especially, but not exclusively, concerned with wet substrates suitable for use as combined hand cleaning and drying means, and portable or wall-mounted dispensers therefore. Wet articles of this type are especially useful for locations in which hygiene is important but provision of alternative hygiene systems such as running water may be inconvenient, for example, hospital wards, ambulances and mobile kitchens (e.g. ice-cream and hot-dog vans).

The dry counterparts of such wet articles, namely, paper towels and tissues in dispensers, have been well-known for many years. According to one very common system, of which many variants exist, individual towels or tissues are arranged in an interleaved fashion in the dispenser in such a way that when one towel or tissue is pulled out by the consumer, the end of the next is automatically partially pulled out to provide an end for the next consumer to grasp. Alternatively, and more conveniently for the supplier, the substrate may be in continuous form and the consumer tears off the required length, either with the aid of perforations or by means of a suitable cutting edge. The substrate is most commonly and conveniently packed as a roll which may feed from the outside, as in toilet roll dispensers, or from the centre, as in certain paper towel dispensers using a cutting edge. With all these systems it is necessary for a certain length of substrate to protrude from the dispenser for the consumer to grasp; if the dispenser is designed such that the pulling and tearing-off operation does not leave an adequate length of substrate protruding, as may be the case in designs incorporating a straight cutting edge, a mechanism, either consumer-actuated or automatic, generally needs to be included to advance the substrate after use.

In systems where the substrate carries a liquid, it is important that loss of liquid by evaporation be prevented as far as possible. It is therefore necessary to use as tight a seal or closure as possible at the point at which the substrate emerges from the dispenser. However, the requirement for a protruding end for the consumer to grasp presents a problem here: during periods of infrequent usage, the protruding end will dry out by evaporation. This in itself is not especially disadvantageous, but the real problem is that the dried-out end provides a route for drying out of the main reservoir of rolled or folded substrate by a continuous process of capillary action and evaporation. This will occur however tight the closure at the point at which the substrate emerges.

The problem of fluid loss by capillary action and evaporation can be alleviated by the use of suitable combinations of fluids and substrates having specially chosen properties, for example, the viscosity and surface tension of the fluid and the pore size and hydrophilicity/hydrophobicity of the substrate, but this places undesirable restrictions on the product quite unconnected with its intended use.

According to the present invention, the problem of liquid loss by capillary action and evaporation has now been very substantially alleviated by incorporating in the substrate a pattern of physical barriers, for example, lines of a hydrophobic material such as paraffin wax, that restrict the transport of fluid along the length of the substrate.

DE No. 26 25 176A (Schickedenz) discloses a cleaning cloth of non-woven fabric, wet-strength crepe paper or the like, of which a portion is treated (impregnated) with a concentrated detergent composition and the remainder is untreated, the detergent-impregnated portion being separated from the untreated portion by a boundary consisting of a hydrophobic substance. The boundary may consist of two closely spaced parallel lines of hydrophobic plastics material.

U.S. Pat. No. 3,965,518 (Muoio/S.C. Johnson & Son Inc) discloses a disposable impregnated wiper for the treatment of household surfaces such as furniture. The wiper is in the form of a cellulosic substrate impregnated with an oil-in-water emulsion, the substrate having lines of bonding material impregnated into at least one surface in a fine pattern, for example, a diamond pattern grid, of which the repeat unit size is no more than about $\frac{1}{4}$ inch (6.35 mm) in any direction and is normally much smaller. U.S. Pat. No. 3,965,519 (Hermann/S.C. Johnson & Son Inc) discloses a floor-cleaning wiper of similar construction, of which the substrate is a nonwoven fabric having a basis weight of at least 40 $g/m^2$ and the impregnant is an aqueous self-polishing floor coating composition.

The present invention provides an article suitable for wiping surfaces which comprises an elongate web substrate impregnated with a liquid composition, the substrate being divided along its length into a plurality of individual areas by a pattern of barrier material capable of preventing or substantially reducing the migration of the liquid composition from one individual area to the next, the barrier material penetrating through the whole thickness of the substrate, the pattern being such as to constitute a plurality of barriers each extending across the whole width of the substrate, and the repeat spacing of the pattern being at least 8 mm, preferably at least 10 mm, more preferably at least 20 mm, and advantageously not exceeding 50 mm.

The invention further provides a delivery system for an impregnated substrate, which system comprises:

(a) a dispenser having a relatively tight closure for the egress of wipe material therefrom and, in the dispenser, (b) an elongate web substrate impregnated with a liquid composition, the substrate being divided along its length into a plurality of individual areas by a pattern of barrier material capable of preventing or substantially reducing the migration of the liquid composition from one individual area to the next, the barrier material penetrating through the whole thickness of the substrate, the pattern being such as to constitute a plurality of barriers each extending across the whole width of the substrate.

For convenience, the impregnated substrate article of the invention will hereinafter be referred to as a "wet wipe", and the article in conjunction with a dispenser as a "wet wipe delivery system".

The substrate may consist of any material having suitable properties. As the basis of a wet wipe it must be capable of absorbing and retaining, and releasing in use, an appropriate amount of the liquid composition, and when wet it must have suitable tensile strength, tear strength and stretch properties for use in a dispenser. It should also have a pleasant "feel" to the consumer during use.

Preferred materials for the substrate are paper and nonwoven fabrics, paper generally being preferred on economic grounds.

Creped paper having a basis weight in the range of from 30 to 70 g/m$^2$, preferably 40 to 60 g/m$^2$ and more preferably 45 to 50 g/m$^2$, is an especially suitable material for use as the substrate. Some lighter grades may not display sufficient absorbency and tensile strength.

Two examples of creped paper of this type suitable for use in the present invention are "Duftex m.3" and "Duftex o.KS" available from Gessner & Co. GmbH, Bruckmühl, West Germany. "Duftex m.3" has a basis weight of 50 g/m$^2$, a thickness of 0.12–0.14 mm, typical dry tensile strengths in the machine and cross directions respectively of 3.5 kg and 1.7 kg, and typical wet tensile strengths in the machine and cross directions respectively of 0.8 and 0.35 kg. Corresponding typical values for "Duftex o.KS" are 45 g/m$^2$, 0.12–0.13 mm, 3.1 and 1.6 kg, and 0.7 and 0.3 kg. Both grades have a degree of absorption (Klemm) of 70 to 100 mm/10 minutes and an absorption time of 5–10 seconds. Both grades are based on a softwood furnish and are impregnated with a wet strength resin (a cross-linked cationic polyalkyleneimine, such as Luresil (BASF), Nadavin (Bayer AG) or Resamin (Hoechst AG)).

As an alternative to paper, nonwoven fabrics may be used. Wet laid nonwoven fabrics are especially preferred. Materials of this type having basis weights of from 25 to 40 g/m$^2$, preferably from 30 to 35 g/m$^2$, are advantageously used.

An example of a wet-laid nonwoven fabric suitable for use in the present invention is Storalene (Trade Mark) 741:35, available from Stora-Coppaberg, Sweden. It is produced from a furnish of mixed cellulosic and viscose fibres with a vinyl acetate binder and has a nominal basis weight of 35 g/m$^2$ and a thickness of 0.17 mm. Typical tensile strengths in the machine and transverse directions are 750 and 550 N/m (dry) and 350 and 280 N/m (wet).

Dry-laid nonwoven fabrics, for example, carded and air-laid materials, may also be suitable for use in the invention. In this case the basis weight is preferably from 18 to 40 g/m$^2$. Air-laid nonwoven fabrics may be composed of long or short fibres, or blends of the two types.

One example of a carded nonwoven fabric suitable for use in the present invention is "PHM 25", available from Bonded Fibre Fabric, Bridgewater, Somerset, England. This consists of viscose fibres bonded with acrylic resin and has a nominal basis weight of 23.5 g/m$^2$. Typical mean strengths in the machine and transverse directions are 4.6 kg and 0.56 kg (dry) and 2.3 kg and 0.32 kg (wet), measured on a sample of width 50 mm at a draw speed of 200 mm/min.

Spun-bonded nonwoven fabrics may also be used in the present invention. These preferably have a basis weight of from 18 to 40 g/m$^2$. One example of a suitable spun-bonded nonwoven fabric is "Asahi N1020" available from Mitsubishi Asahi, Japan. This has a basis weight of 20 g/m$^2$ and a thickness of 0.13 mm, and has typical tensile strengths in the machine and transverse directions respectively of 4.0 kg and 1.5 kg, and typical tearing strengths of 0.8 kg and 0.4 kg respectively. Its typical burst strength is 2.0 kg/cm$^2$.

If required, the substrate may be periodically provided with perforations, spaced so as to provide a convenient length of wipe for the consumer.

The liquid composition with which the substrate is impregnated will of course depend on the intended end-use. For most household and personal cleaning purposes, however, it will generally contain some water.

For hand-cleaning, a water-based composition is preferably used, advantageously also containing a physiologically unobjectionable more volatile material, especially a lower alcohol, preferably ethanol, to act as a drying aid when the wipe is used. Ethanol and isopropanol also have the advantage of acting as biocides. Other materials such as emollients, detergent-active agents, biocides, perfumes and buffers, may also be present either in solution (preferred) or in suspension.

In order effectively to prevent the migration of this composition along the wipe the barriers provided according to the present invention will generally be made of material that is not appreciably wetted by the liquid composition used. Thus where the liquid composition contains a substantial amount of water the barriers are preferably made of hydrophobic material. Examples of suitable hydrophobic materials include waxes, for example paraffin wax. Other suitable materials include hydrophobic plastics materials, especially synthetic condensation resins such as self-reactive vinyl/acrylic polymer emulsions (known as "binder resins"); silicones; some grades of polyvinyl alcohol; natural and synthetic rubbers; and resins such as Shellac.

The barrier material is preferably solid, but can be in the form of a gel or a highly viscous liquid, as long as when applied in a pattern it retains its integrity and does not spread too much.

Advantageously the pattern of barrier material is applied by a printing method, for example using a gravure (recessed) print roller. If by this method the barrier material pattern is applied to one side only of the substrate, steps should be taken as necessary to ensure that it penetrates through the entire thickness of the substrate.

Where the substrate is a nonwoven fabric consisting partly of thermoplastic fibres such as polypropylene, the barriers may be created by local heat-sealing.

The barrier pattern preferably consists of lines, and the widths of the lines are advantageously not greater than 5 mm. If the lines are too wide they will occupy too great an area of the wipe, and will be detrimental to its appearance and feel.

The pattern formed by the barrier material may be simple or complex according to taste. At its simplest it may consist merely of a series of straight parallel lines transverse to the longitudinal axis of the substrate. In this case the repeat spacing is simply the distance between adjacent lines. This is preferably at least 8 mm, more preferably at least 10 mm, especially at least 20 mm and advantageously not more than 50 mm. Other patterns are described below in connexion with the accompanying drawings.

If the repeat spacing of the pattern is too large, the area of wipe that can dry out will form too large a proportion of the whole; the first consumer after a period of non-use will receive a wipe of which too large an area has dried out. On the other hand, if the repeat spacing is too small, the barriers will occupy too large a proportion of the surface area of the wipe, reducing its absorbency, and hence the amount of liquid it can carry, below an acceptable value. The barriers may also feel unpleasant to the user.

In one of its aspects the present invention includes a dispenser for the wet wipe. The dispenser has a closure or seal through which the wet wipe material is withdrawn for use, the closure being sufficiently tight that fluid loss by direct evaporation from the main body of stored wipe in the dispenser is kept to as low a level as possible.

According to a preferred embodiment of the invention, the dispenser has a closure comprising an inner diaphragm and an outer diaphragm each with an opening therethrough completely out of register with each other, the opening in at least one of the diaphragms being resiliently sealed by the other diaphragm. Such a closure, and a dispenser comprising such a closure, are described and claimed in European Patent Application No. 0 006 709A (Unilever), the disclosure of which is hereby incorporated by reference.

In what is probably the simplest form of this type of closure, it comprises two resilient diaphragms lying flatly one against the other and each pierced by an opening such that the two openings are completely out of register, each of the diaphragms resiliently sealing the hole in the outer diaphragm. In such instance if a wipe is to be removed from the dispenser it must pass through one opening and then between the two diaphragms across a zone of contact to the other opening and through that opening to the exterior of the dispenser. The passage of the wipe from one opening to the other across the zone of contact is of course permitted as a result of resilient flexure or deformation of the diaphragms.

Instead of the entire areas of the diaphragms contacting one another the diaphragms can contact each other at least over a continuous contact zone which surrounds the opening in only one of the diaphragms. Such a contact zone seals one opening from the other and can be provided for example by a rib or protrusion surrounding the opening. Providing a contact zone surrounding the opening in both of the diaphragms can increase the seal between the openings.

Conveniently the contact zone rims the opening in a diaphragm.

A frustoconical wall portion can extend from a diaphragm to terminate in a free end forming the opening in the diaphragm. The frustoconical wall portion can be in the outer diaphragm, the frustum providing a recess in the top of the diaphragm in which the free end of the next extracted wipe can be contained and readily gripped between the user's fingers.

The frustoconical wall portion can be resilient, a particularly good seal being achievable between the contact zone rimming the opening at the free end of the frustum and the other diaphragm.

To minimise the risk of the frustoconical wall portion being inverted in use the frustoconical wall portion is preferably a frustum of an oblique cone.

The opening in a diaphragm can be provided with an edge flange extending along at least part of the edge of the opening to minimise the risk of tearing the wipe as it is pulled through the opening.

A convenient construction is to provide an inner diaphragm adapted to snap engage the mouth of a container and an outer diaphragm adapted to snap engage with the inner diaphragm.

In the aforementioned European Patent Application No. 0 006 709 A, there is described in detail a closure of the type in question applied to the mouth of an open-topped, tub-like container suitable for use as a small, portable dispenser of wipes, for example, for personal or household use. The use of such a dispenser is within the scope of the present invention.

Such a portable, personalised dispenser may advantageously be provided with an additional flip, snap or screw lid which when closed covers the opening in the outer diaphragm. This prevents or reduces drying-out of the protruding end of wipe between uses.

The present invention also, however, encompasses the use of larger dispensers installed as fixtures in public places such as public washrooms, kitchens or hospital wards. Such dispensers may be of similar general construction to the smaller ones described in European Patent Application No. 0 006 709A, but for convenience the closure will generally, but not exclusively, be at the bottom of the dispenser rather then at the top. There will also be no additional lid or cover as mentioned in the previous paragraph, since this would present an obvious hygiene hazard in a dispenser used by large numbers of people: the cover would first be touched by the hands before cleaning, and thus contaminated, and after a wipe had been used the cover would have to be closed again causing recontamination of the hands. If desired a cover provided with an automatic, or perhaps elbow-actuated, opening and closing mechanism could be provided, but this tends to introduce undesirable complexity to the dispenser design and a possible source of unreliability. An external cover is by no means necessary, because the tightness of the closure minimises fluid loss by direct evaporation from the main body of the wipe in the dispenser and the barriers on the substrate minimise fluid loss by capillary action and evaporation.

By means of the barrier system of the present invention it has proved possible to achieve a very substantial reduction in the liquid loss from a wet wipe system in a dispenser. The reduction in fluid loss has the concomitant advantage that it reduces the possibility of certain active materials in the liquid composition—detergents, biocides, etc—becoming concentrated to a biologically hazardous level. Constraints on choice of substrate and of liquid composition are removed. The barrier pattern may be aesthetically pleasing and enhance the appearance of the wipe, especially if colouring matter is included. Only small quantities of the barrier material are needed and it can easily be applied by an inexpensive, simple process.

Although the wet wipe system of the invention has been described with specific reference to hand-cleaning, it is of course equally suitable for many other uses which will be obvious to the man skilled in the art.

The invention will now be explained in more detail, by way of example only, with reference to the accompanying drawings, in which.

Figure 1:
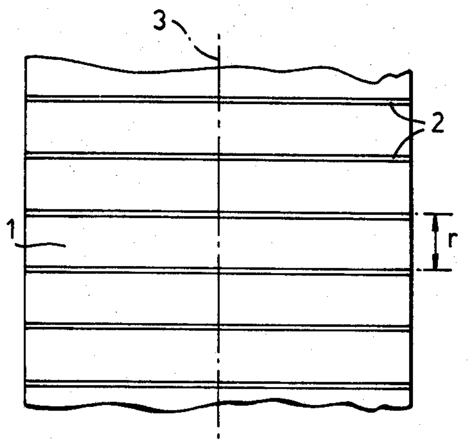
FIGS. 1 to 6 show examples of substrates provided with barrier patterns according to the invention.

Referring first to FIG. 1 of the drawings, a substrate 1 is provided with a very simple pattern of parallel narrow stripes 2 transverse to its longitudinal axis 3. For the purposes of clarity the thickness of the stripes has been somewhat exaggerated. The repeat spacing r, which is always measured in a direction parallel to the longitudinal axis of the substrate, is in this arrangement simply equal to the distance between the leading edges of adjacent stripes.

Figure 2:
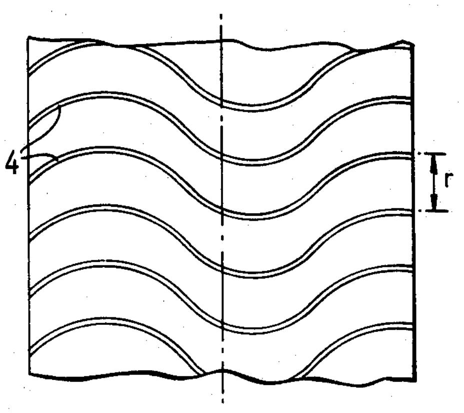
Figure 3:
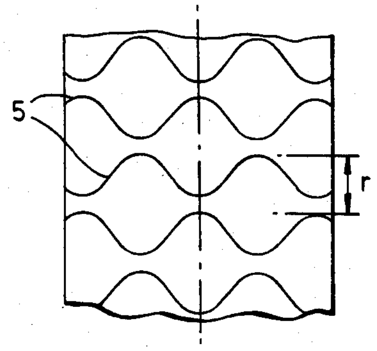
Figure 4:
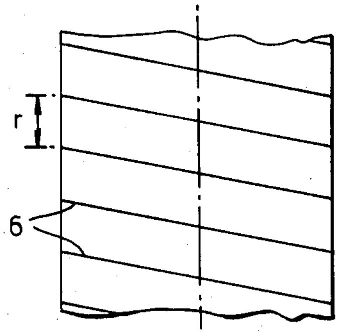

In a variation of this, shown in FIG. 2, wavy parallel stripes 4 are used instead of straight ones. FIGS. 3 and 4 show two further variants; in these Figures the stripes are shown as lines for the sake of simplicity. In FIG. 3 a pattern of wavy non-parallel lines 5 is used, and in FIG. 4 the barriers are in the form of lines 6 that are not transverse to the longitudinal axis of the substrate but slightly offset. In all these arrangements it is essential that each line (stripe) extends across the whole width of the substrate, since there are no crossing points. In the arrangement of FIG. 4, the angle of the lines (stripes) to the transverse direction is relatively small to ensure that the longitudinal path available for liquid migration is relatively short.

Figure 5:
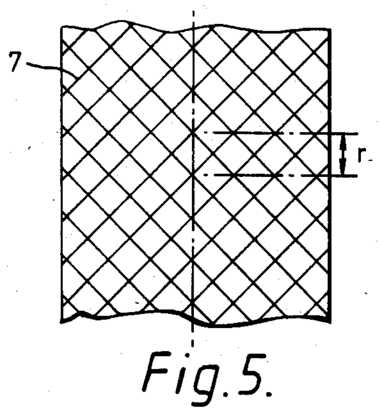

One way of shortening this path length is to use a second set of lines intersecting the first set to form a grid pattern 7, as shown in FIG. 5. Advantageously neither set of lines is parallel to the longitudinal axis of the substrate. In FIG. 5 each set of lines is at 45° to the longitudinal direction and the two sets are perpendicular to one another. This arrangement has the advantage of providing a large number of relatively small areas by means of a very simple pattern, and it gives an aesthetically pleasing "quilted" effect.

Figure 6:
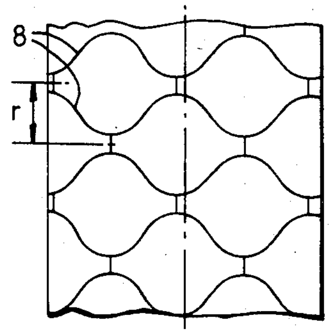

FIG. 6 shows an example of a more complicated design 8.

Figure 7:
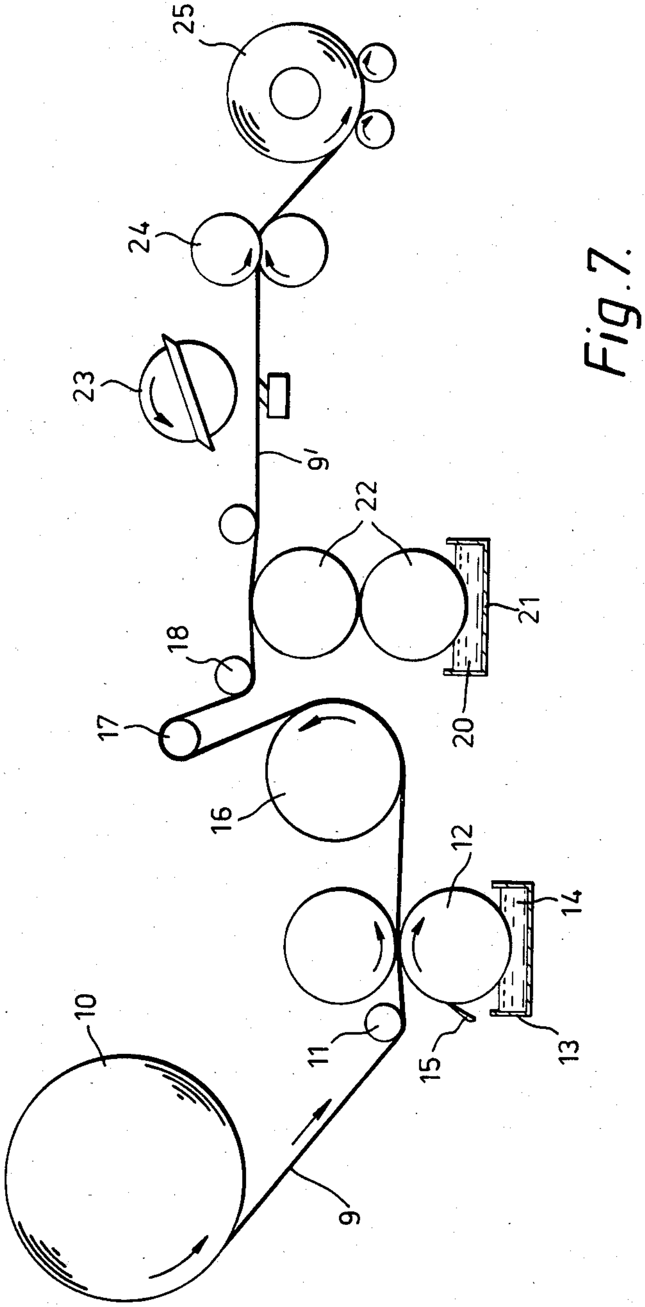
FIG. 7 is a schematic diagram of a process for the production of a wet wipe according to the present invention.

FIG. 7 shows, schematically, an example of a continuous process for production of a wet wipe according to the invention. Dry substrate 9 is unwound from a supply roll 10, passes round a tensioning roller 11 and onto a grooved printing roller 12 dipping into a bath 13 of molten paraffin wax 14. The roller 12 is heated to maintain the wax in a molten state. A doctor blade 15 removes excess wax from the surface of the roller 12 before it contacts the substrate 9. The substrate 9 then passes around a heated roller 16, to ensure thorough penetration of the wax through the whole thickness of the substrate. It then passes around further tensioning rollers 17 and 18 and is impregnated with a liquid cleaning composition 20 from a bath 21 by means of a two-roll kiss coater 22. The wet substrate 9′ then passes through a perforator 23 and a slitter 24, and the substrate is finally wound off, preferably in the form of a coreless roll 25.

Figure 8:
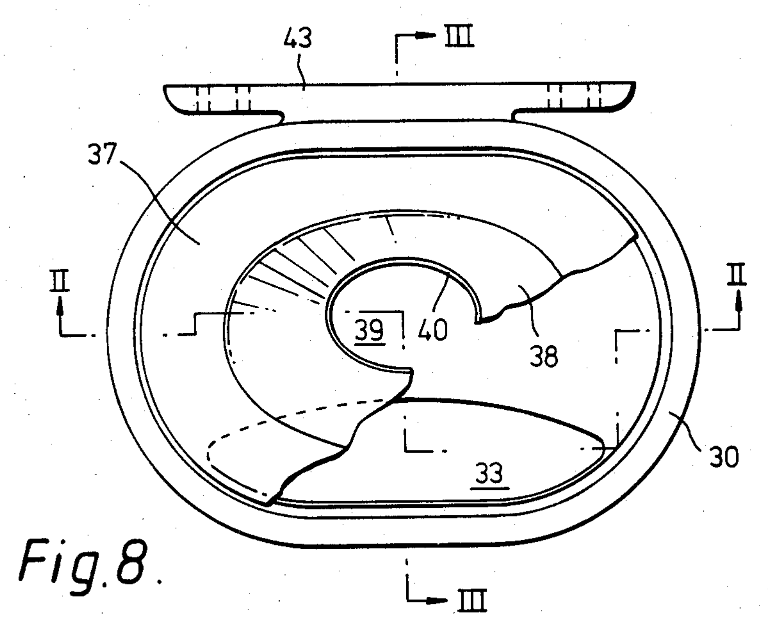
FIG. 8 is a plan view from below of a dispenser suitable for use in the wet wipe delivery system of the invention.
Figure 10:
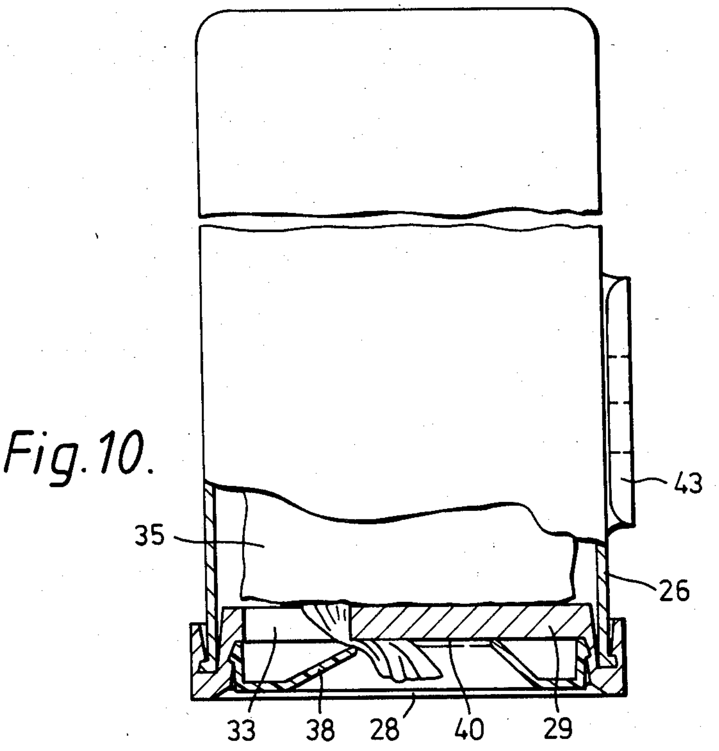
FIG. 10 is a sectional view taken on the line III—III of FIG. 8.
Figure 9:
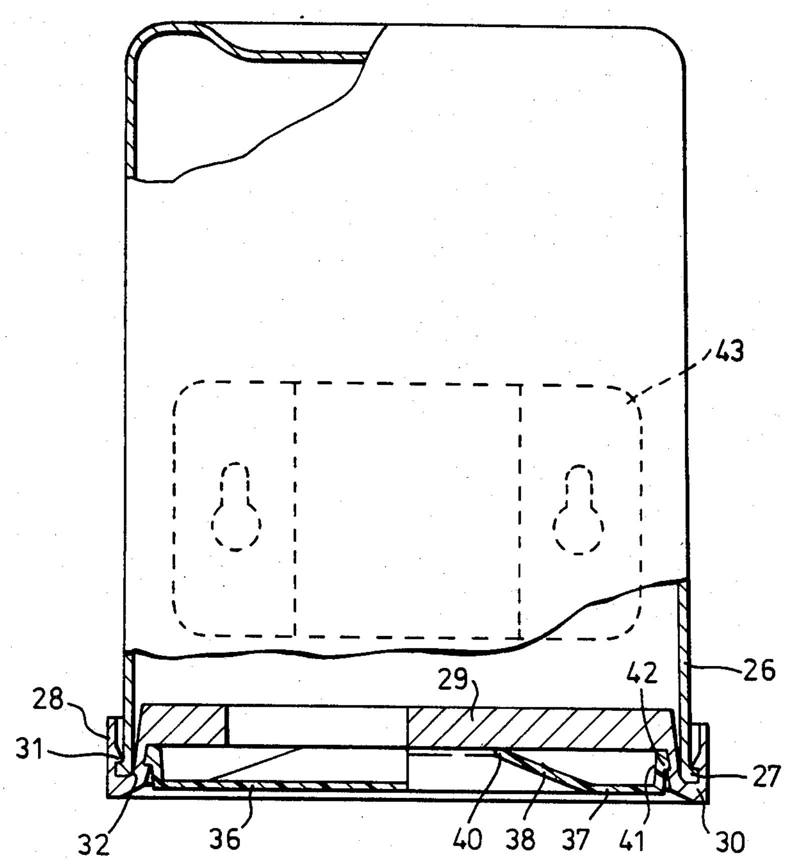
FIG. 9 is a partly sectioned side elevation along the line II—II of FIG. 8.

FIGS. 8, 9 and 10 show one example of a wall-mounted dispenser suitable for use in the wet wipe delivery system of the invention. A closure of the type described and claimed in European Patent Application No. 0 006 709A is shown applied to the underside of a tub-like wall-mounted dispenser 26 having a detent rib 27 around the open base.

The closure comprises a stiff or rigid inner diaphragm 28 which itself comprises a planar central portion 29 and a channel-shaped, circumferential flange structure 30 having an outer detent rib 31 and an inner detent rib 32. The outer detent rib 31 snap fits over the detent rib 27 of the mouth of container 26 so as to secure the diaphragm thereto in hermetic engagement therewith.

The central portion 29 of diaphragm 28 has an opening 33 formed in it of more or less elliptical shape. The central portion 29 provides a support for a roll 35 of wet wipe material.

An outer diaphragm 36 is made of an elastomeric or resilient plastics material. In FIG. 8 part of the outer diaphragm 36 is cut away to show the inner diaphragm 28. The outer diaphragm has a planar portion 37 from which a resilient frustoconical wall portion 38 extends to terminate at the free end in an elliptical opening 39 forming the opening through the diaphragm 36 having a rim 40. The frustoconical portion 37 is a frustum of an oblique substantially elliptical cone so that the inclined surface surrounding the opening 39 is of varying width from place to place about the periphery of the opening.

The outer diaphragm 36 is secured in place by means of a detent rim flange 41 having a detent rib 42 thereon which snap fits into the inner detent rib 32 of the flange structure 30 of the outer diaphragm 36.

When secured in position relative to the inner diaphragm the rim of the opening 38 in the outer diaphragm resiliently contacts the planar portion 29 of the inner diaphragm, the rim 39 of the opening forming the continuous contact zone surrounding the opening 38 in only the outer diaphragm and not surrounding or overlapping the opening 33 in the inner diaphragm. The resilient engagement of the rim of the opening 38 with the inner diaphragm forms a substantially hermetic seal of the opening 38 to seal the container.

A rolled or folded length 35 of wet wipe material is contained within the dispenser 26. The free end of the wipe to be extracted is compressed and extended through the opening 33 in the inner diaphragm and under the rim 40 of the opening 39 which is completely out of register with the opening 33 to be held thereby in pressure contact with the central planar portion 29 of diaphragm 28. The free end of the length of wipe is then disposed substantially as shown in FIG. 10 in the recess formed by the frustoconical wall portion 38 where it can be readily gripped by the user. Wipes may be withdrawn as desired by gripping the free end of the wipe next to be extracted and pulling it away from the dispenser through opening 39.

When a wipe is being withdrawn a portion of the next wipe will be pulled under the rim 40 of opening 39 as a result of resilient deformation of the frustconical portion of diaphragm 36 before the first mentioned wipe tears away, thus rendering the next wipe ready for removal.

Pulling the wipe through the opening 39 in the outer diaphragm tends to cause the frustoconical portion to invert but this risk is reduced because the frustum is that of an oblique cone.

The dispenser 26 is provided with an integral bracket 43 by means of which it may be mounted on vertical surface such as a wall or a door.

Whilst dependent on the thickness and compressibility of the wipe, and the resilience of the diaphragm, the closure described provides an improved sealing of the dispenser to minimise fluid loss by evaporation from the main body of wipe stored therein.

Variants on the design described above are of course possible in which a frustoconical wall portion, resilient or rigid, can be provided on one or both of the diaphragms. When the frustoconical portion is rigid the necessary resilience to obtain the desired seal can be obtained either from resilience elsewhere in the diaphragm or in the other diaphragm. Substantially flat diaphragms can be used one or both of which may have contact zones surrounding or rimming the openings.

One or other of the diaphragms may if desired be integral with the dispenser closed thereby.

Figure 11:
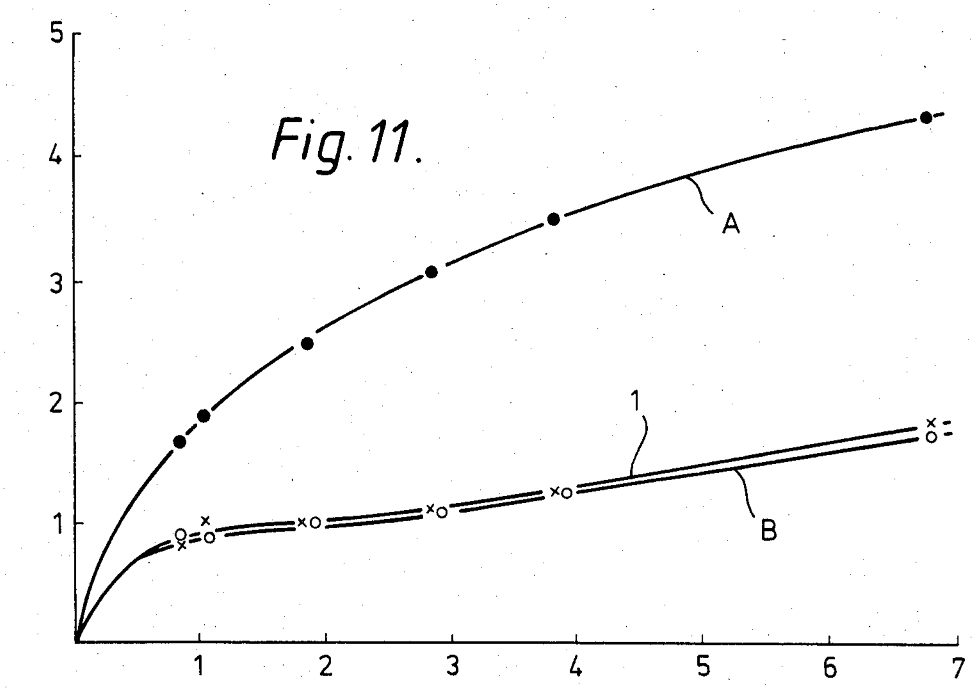
FIGS. 11 and 12 are graphical representations of the results of Examples 1 and 2 respectively.
Figure 12:
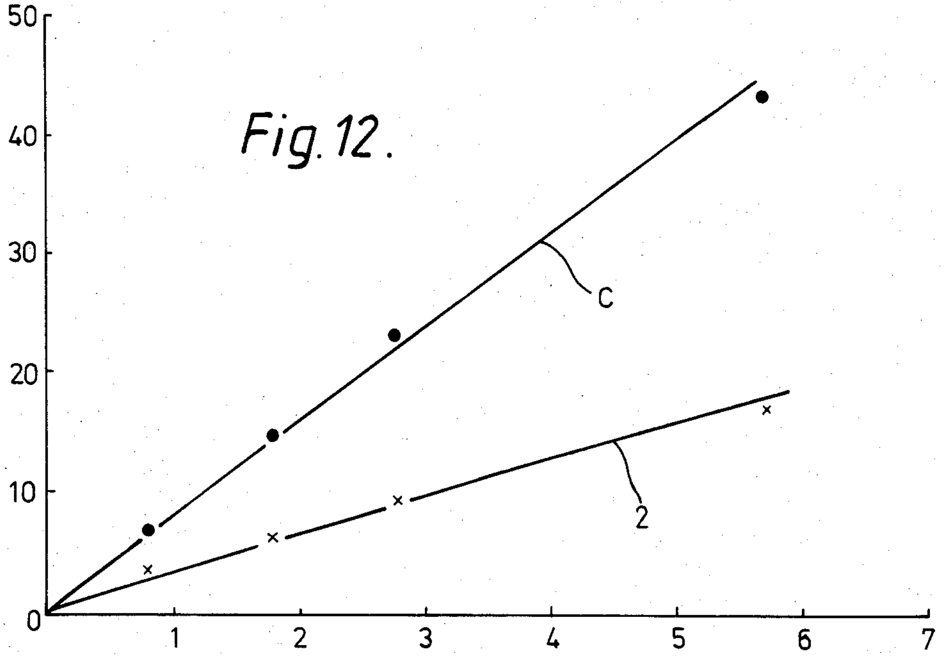

The invention is further illustrated by the following non-limiting Examples, in which reference is made to FIGS. 11 and 12 of the accompanying drawings.

EXAMPLE 1

A 2 m length of Gessner Duftex M3 (50 g/m$^2$) crepe paper 86 mm wide was printed with lateral stripes of Solmedia crystalline embedding wax at 30 mm intervals down the length using the following technique.

Molten wax was applied to the paper using a warmed drafting pen to form a fine line of solid wax on the surface of the paper. Using a heat gun the wax line was heated from the other side of the paper so that it remelted and impregnated the paper to form a visible stripe of width 0.5 mm.

The paper was rolled lengthwise and impregnated with 13.8 g of a solution of 7% ethanol and 0.75% isopropanol in deionised water. The liquid was uniformly applied to the edge of the roll standing upright in a 1 liter Kilner jar using a hypodermic syringe. The jar was sealed for several hours to allow equilibration of liquid. Two cuts 20 mm long were then made on the plastic lid of the container to form an X-shape. An end of paper was withdrawn from the centre of the roll and passed through the X-orifice to give a protruding end 70 mm long.

The jar was stored upright at 22° C. and 53% relative humidity for several days, daily weighings being made to determine liquid loss.

Concurrently two control samples were monitored, one sample (Comparative Example A) with no wax barrier but otherwise similar, and the other (Comparative Example B) having the 'wick' (the protruding end) separated from the main paper roll. The latter sample therefore registered losses other than those attributable to capillary action and evaporation.

The results are tabulated below.

| Time (days) | Liquid Loss (g) Example 1 | Comparative Example A | Comparative Example B |
|---|---|---|---|
| 1 | 1.0 | 1.9 | 0.9 |
| 2 | 1.0 | 2.6 | 1.0 |
| 3 | 1.1 | 3.2 | 1.1 |
| 4 | 1.3 | 3.6 | 1.3 |
| 7 | 1.9 | 4.5 | 1.8 |

These results are shown graphically in FIG. 11 of the accompanying drawings, in which the liquid loss in grams as ordinate is plotted against the time in days as abscissa. It can be seen that liquid loss by capillary action and evaporation had been substantially reduced by the presence of the wax barriers.

EXAMPLE 2

A 300 mm length of Gessner Duftex M3 (50 g/m$^2$) crepe paper 86 mm wide was impregnated with wax at 30 mm intervals by the procedure described in Example 1. A Kilner jar with a closure as described in Example 1 was one quarter filled with a 7.75% alcohol in water solution. The paper was moistened with the solution and placed in the jar so that one end of the paper was immersed in the liquid and the other protruded 70 mm through the lid. The jar was maintained at 22° C. and 53% RH for several days. A control sample without a wax barrier (Comparative Example C) was examined concurrently. Liquid loss was determined by weighing as in Example 1, and the results are tabulated below and shown graphically in FIG. 12 of the accompanying drawings, in which the liquid loss in grams as ordinate is plotted against the time in days as abscissa.

| Time (days) | Liquid Loss (g) Example 2 | Comparative Example C |
|---|---|---|
| 1 | 3.4 | 8.0 |
| 2 | 6.4 | 15.6 |
| 3 | 9.5 | 23.3 |
| 6 | 18.5 | 46.2 |

It may be seen that under the experimental conditions used the total liquid loss was essentially linear with time. The liquid loss rate of the control C was calculated to be 3.7 grams per hour per meter width of substrate, while the corresponding figure for the sample with wax barriers was 1.5 g/hr/m.

EXAMPLE 3

A 2 m length of Gessner Duftex M3 (50 g/m$^2$) crepe paper 86 mm wide was provided with lateral stripes of Vinamul (Trade Mark) 4320, a self-reactive vinyl acrylic polymer emulsion available from Vinyl Products Ltd. The emulsion was applied using a drafting pen to both sides of the paper to ensure total impregnation and then dried and crosslinked with a heat gun. The finished stripes were 1 mm wide.

The paper was then tested for liquid loss reduction, in comparison with a control without resin barriers, by the procedure described in Example 1. Similar results were obtained.

We claim:

1. An article suitable for wiping surfaces which comprises an elongate web substrate impregnated with a liquid composition, the substrate being divided along its length into a plurality of individual areas by a pattern of barrier material, capable of preventing or substantially reducing the migration of the liquid composition from one individual area to the next, said barrier material penetrating through the whole thickness of the substrate, the substrate not being impregnated with liquid in regions occupied by said barrier material, said pattern being such as to constitute a plurality of barriers each extending across the whole width of the substrate, and the repeat spacing of said pattern at least 8 mm.

2. The article of claim 1, wherein the repeat spacing of the pattern is at least 10 mm.

3. The article of claim 1, wherein the repeat spacing of the pattern is at least 20 mm.

4. The article of claim 1, wherein the repeat pattern spacing does not exceed 50 mm.

5. The article of claim 1, wherein the barrier material is a hydrophobic material.

6. The article of claim 1, wherein the substrate is of paper or nonwoven fabric.

7. The article of claim 6, wherein the substrate comprises creped paper having a basis weight within the range of from 30 to 70 g/m$^2$.

8. The article of claim 6, wherein the substrate comprises wet-laid nonwoven fabric having a basis weight within the range of from 25 to 40 g/m$^2$.

9. The article of claim 6, wherein the substrate comprises dry-laid or spun-bonded nonwoven fabric having a basis weight within the range of from 18 to 40 g/m$^2$.

10. The article of claim 1, wherein the liquid composition includes water.

11. The article of claim 1, wherein the pattern of barrier material comprises lines.

12. The article of claim 11, wherein the barrier pattern consists of parallel lines transverse to the longitudinal axis of the substrate.

13. An article suitable for wiping surfaces, which comprises an elongate web substrate impregnated with an aqueous liquid composition, the substrate being divided along its length into a plurality of individual areas by a pattern of wax barrier material, said material penetrating through the whole thickness of the substrate and said pattern being such as to constitute a plurality of barriers each extending across the whole width of the substrate, whereby migration of said liquid composition from one individual area to the next is prevented or substantially reduced.

* * * * *

UNITED STATES PATENT AND TRADEMARK OFFICE
CERTIFICATE OF CORRECTION

PATENT NO. : 4,601,938 Page 1 of 16

DATED : July 22, 1986

INVENTOR(S) : Deacon et al.

It is certified that error appears in the above—identified patent and that said Letters Patent is hereby corrected as shown below:

Delete columns 3 and 4 and insert therefor:

-- The substrate may consist of any material having suitable properties. As the basis of a wet wipe it must be capable of absorbing and retaining, and releasing in use, an appropriate amount of the liquid composition, and when wet it must have suitable tensile strength, tear strength and stretch properties for use in a dispenser. It should also have a pleasant "feel" to the consumer during use.

Preferred materials for the substrate are paper and nonwoven fabrics, paper generally being preferred on economic grounds.

UNITED STATES PATENT AND TRADEMARK OFFICE
CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

Creped paper having a basis weight in the range of from 30 to 70 $g/m^2$, preferably 40 to 60 $g/m^2$ and more preferably 45 to 50 $g/m^2$, is an especially suitable material for use as the substrate. Some lighter grades may not display sufficient absorbency and tensile strength.

Two examples of creped paper of this type suitable for use in the present invention are "Duftex m.3" and "Duftex o.KS" available from Gessner & Co. GmbH, Bruckmühl, West Germany. "Duftex m.3" has a basis weight of 50 $g/m^2$, a thickness of 0.12-0.14 mm, typical dry tensile strengths in the machine and cross directions respectively of 3.5 kg and 1.7 kg, and typical wet tensile strengths in the machine and cross directions respectively of 0.8 and 0.35 kg. Corresponding typical values for "Duftex o.KS" are 45 $g/m^2$, 0.12-0.13 mm, 3.1 and 1.6 kg, and 0.7 and 0.3 kg. Both grades have a degree of absorption (Klemm) of 70 to 100 mm/10 minutes and an absorption time of 5-10 seconds. Both grades are based on PATENT NO. : 4,601,938 Page 3 of 16
DATED : July 22, 1986
INVENTOR(S) : Deacon et al.

It is certified that error appears in the above—identified patent and that said Letters Patent is hereby corrected as shown below:

a softwood furnish and are impregnated with a wet strength resin (a cross-linked cationic polyalkyleneimine, such as Luresil (BASF), Nadavin (Bayer AG) or Resamin (Hoechst AG)).

As an alternative to paper, nonwoven fabrics may be used. Wet laid nonwoven fabrics are especially preferred. Materials of this type having basis weights of from 25 to 40 $g/m^2$, preferably from 30 to 35 $g/m^2$, are advantageously used.

An example of a wet-laid nonwoven fabric suitable for use in the present invention is Storalene (Trade Mark) 741:35, available from Stora-Coppaberg, Sweden. It is produced from a furnish of mixed cellulosic and viscose fibres with a vinyl acetate binder and has a nominal basis weight of 35 $g/m^2$ and a thickness of 0.17 mm. Typical tensile strengths in the machine and transverse directions are 750 and 550 N/m (dry) and 350 and 280 N/m (wet).

CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

Dry-laid nonwoven fabrics, for example, carded and air-laid materials, may also be suitable for use in the invention. In this case the basis weight is preferably from 18 to 40 $g/m^2$. Air-laid nonwoven fabrics may be composed of long or short fibres, or blends of the two types.

One example of a carded nonwoven fabric suitable for use in the present invention is "PHM 25", available from Bonded Fibre Fabric, Bridgewater, Somerset, England. This consists of viscose fibres bonded with acrylic resin and has a nominal basis weight of 23.5 $g/m^2$. Typical mean strengths in the machine and transverse directions are 4.6 kg and 0.56 kg (dry) and 2.3 kg and 0.32 kg (wet), measured on a sample of width 50 mm at a draw speed of 200 mm/min.

Spun-bonded nonwoven fabrics may also be used in the present invention. These preferably have a basis weight of from 18 to 40 $g/m^2$. One example of a suitable spun-

UNITED STATES PATENT AND TRADEMARK OFFICE
CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

bonded nonwoven fabric is "Asahi N1020" available from Mitsubishi Asahi, Japan. This has a basis weight of 20 $g/m^2$ and a thickness of 0.13 mm, and has typical tensile strengths in the machine and transverse directions respectively of 4.0 kg and 1.5 kg, and typical tearing strengths of 0.8 kg and 0.4 kg respectively. Its typical burst strength is 2.0 $kg/cm^2$.

If required, the substrate may be periodically provided with perforations, spaced so as to provide a convenient length of wipe for the consumer.

The liquid composition with which the substrate is impregnated will of course depend on the intended end-use. For most household and personal cleaning purposes, however, it will generally contain some water.

For hand-cleaning, a water-based composition is preferably used, advantageously also containing a physiologically unobjectionable more volatile material,

UNITED STATES PATENT AND TRADEMARK OFFICE
CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

especially a lower alcohol, preferably ethanol, to act as a drying aid when the wipe is used. Ethanol and isopropanol also have the advantage of acting as biocides. Other materials such as emollients, detergent-active agents, biocides, perfumes and buffers, may also be present either in solution (preferred) or in suspension.

In order effectively to prevent the migration of this composition along the wipe the barriers provided according to the present invention will generally be made of material that is not appreciably wetted by the liquid composition used. Thus where the liquid composition contains a substantial amount of water the barriers are preferably made of hydrophobic material. Examples of suitable hydrophobic materials include waxes, for example paraffin wax. Other suitable materials include hydrophobic plastics materials, especially synthetic condensation resins such as self-reactive vinyl/acrylic polymer emulsions (known as "binder resins"); silicones; some grades of polyvinyl alcohol; natural and synthetic rubbers; and resins such as Shellac.

UNITED STATES PATENT AND TRADEMARK OFFICE

CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

The barrier material is preferably solid, but can be in the form of a gel or a highly viscous liquid, as long as when applied in a pattern it retains its integrity and does not spread too much.

Advantageously the pattern of barrier material is applied by a printing method, for example using a gravure (recessed) print roller. If by this method the barrier material pattern is applied to one side only of the substrate, steps should be taken as necessary to ensure that it penetrates through the entire thickness of the substrate.

Where the substrate is a nonwoven fabric consisting partly of thermoplastic fibres such as polypropylene, the barriers may be created by local heat-sealing.

The barrier pattern preferably consists of lines, and the widths of the lines are advantageously not greater than 5 mm. If the lines are too wide they will occupy too great

UNITED STATES PATENT AND TRADEMARK OFFICE
CERTIFICATE OF CORRECTION

PATENT NO. : 4,601,938 Page 8 of 16

DATED : July 22, 1986

INVENTOR(S) : Deacon et al.

It is certified that error appears in the above—identified patent and that said Letters Patent is hereby corrected as shown below:

an area of the wipe, and will be detrimental to its appearance and feel.

The pattern formed by the barrier material may be simple or complex according to taste. At its simplest it may consist merely of a series of straight parallel lines transverse to the longitudinal axis of the substrate. In this case the repeat spacing is simply the distance between adjacent lines. This is preferably at least 8 mm, more preferably at least 10 mm, especially at least 20 mm and advantageously not more than 50 mm. Other patterns are described below in connexion with the accompanying drawings.

If the repeat spacing of the pattern is too large, the area of wipe that can dry out will form too large a proportion of the whole; the first consumer after a period of non-use will receive a wipe of which too large an --.

UNITED STATES PATENT AND TRADEMARK OFFICE

CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

Delete columns 7 and 8 and insert therefor:

-- Figure 9 is a partly sectioned side elevation along the line II-II of Figure 8;

Figure 10 is a sectional view taken on the line III-III of Figure 8; and

Figures 11 and 12 are graphical representations of the results of Examples 1 and 2 respectively.

Referring first to Figure 1 of the drawings, a substrate 1 is provided with a very simple pattern of parallel narrow stripes 2 transverse to its longitudinal axis 3. For the purposes of clarity the thickness of the stripes has been somewhat exaggerated. The repeat spacing r, which is always measured in a direction parallel to the longitudinal axis of the substrate, is in this arrangement simply equal to the distance between the leading edges of adjacent stripes.

UNITED STATES PATENT AND TRADEMARK OFFICE

CERTIFICATE OF CORRECTION

PATENT NO. : 4,601,938 Page 10 of 16

DATED : July 22, 1986

INVENTOR(S) : Deacon et al.

It is certified that error appears in the above—identified patent and that said Letters Patent is hereby corrected as shown below:

In a variation of this, shown in Figure 2, wavy parallel stripes 4 are used instead of straight ones. Figures 3 and 4 show two further variants; in these Figures the stripes are shown as lines for the sake of simplicity. In Figure 3 a pattern of wavy non-parallel lines 5 is used, and in Figure 4 the barriers are in the form of lines 6 that are not transverse to the longitudinal axis of the substrate but slightly offset. In all these arrangements it is essential that each line (stripe) extends across the whole width of the substrate, since there are no crossing points. In the arrangement of Figure 4, the angle of the lines (stripes) to the transverse direction is relatively small to ensure that the longitudinal path available for liquid migration is relatively short.

One way of shortening this path length is to use a second set of lines intersecting the first set to form a grid pattern 7, as shown in Figure 5. Advantageously neither set of lines is parallel to the longitudinal axis

UNITED STATES PATENT AND TRADEMARK OFFICE
CERTIFICATE OF CORRECTION

PATENT NO. : 4,601,938 Page 11 of 16
DATED : July 22, 1986
INVENTOR(S) : Deacon et al.

It is certified that error appears in the above—identified patent and that said Letters Patent is hereby corrected as shown below:

of the substrate. In Figure 5 each set of lines is at 45° to the longitudinal direction and the two sets are perpendicular to one another. This arrangement has the advantage of providing a large number of relatively small areas by means of a very simple pattern, and it gives an aesthetically pleasing "quilted" effect.

Figure 6 shows an example of a more complicated design 8.

Figure 7 shows, schematically, an example of a continuous process for production of a wet wipe according to the invention. Dry substrate 9 is unwound from a supply roll 10, passes round a tensioning roller 11 and onto a grooved printing roller 12 dipping into a bath 13 of molten paraffin wax 14. The roller 12 is heated to maintain the wax in a molten state. A doctor blade 15 removes excess wax from the surface of the roller 12 before it contacts the substrate 9. The substrate 9 then passes around a heated roller 16, to ensure thorough penetration of the wax through the whole thickness of the substrate. It then

UNITED STATES PATENT AND TRADEMARK OFFICE
CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

passes around further tensioning rollers 17 and 18 and is impregnated with a liquid cleaning composition 20 from a bath 21 by means of a two-roll kiss coater 22. The wet substrate 9' then passes through a perforator 23 and a slitter 24, and the substrate is finally wound off, preferably in the form of a coreless roll 25.

Figures 8, 9 and 10 show one example of a wall-mounted dispenser suitable for use in the wet wipe delivery system of the invention. A closure of the type described and claimed in European Patent Application No. 0 006 709A is shown applied to the underside of a tub-like wall-mounted dispenser 26 having a detent rib 27 around the open base.

The closure comprises a stiff or rigid inner diaphragm 28 which itself comprises a planar central portion 29 and a channel-shaped, circumferential flange structure 30 having an outer detent rib 31 and an inner detent rib 32. The outer detent rib 31 snap fits over the detent rib 27 of the mouth of container 26 so as to secure the diaphragm thereto in hermetic engagement therewith.

UNITED STATES PATENT AND TRADEMARK OFFICE
CERTIFICATE OF CORRECTION

PATENT NO. : 4,601,938 
DATED : July 22, 1986
INVENTOR(S) : Deacon et al.

It is certified that error appears in the above—identified patent and that said Letters Patent is hereby corrected as shown below:

The central portion 29 of diaphragm 28 has an opening 33 formed in it of more or less elliptical shape. The central portion 29 provides a support for a roll 35 of wet wipe material.

An outer diaphragm 36 is made of an elastomeric or resilient plastics material. In Figure 8 part of the outer diaphragm 36 is cut away to show the inner diaphragm 28. The outer diaphragm has a planar portion 37 from which a resilient frustoconical wall portion 38 extends to terminate at the free end in an elliptical opening 39 forming the opening through the diaphragm 36 having a rim 40. The frustoconical portion 37 is a frustum of an oblique substantially elliptical cone so that the inclined surface surrounding the opening 39 is of varying width from place to place about the periphery of the opening.

The outer diaphragm 36 is secured in place by means of a detent rim flange 41 having a detent rib 42 thereon which snap fits into the inner detent rib 32 of the flange structure 30 of the outer diaphragm 36.

UNITED STATES PATENT AND TRADEMARK OFFICE
CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

When secured in position relative to the inner diaphragm the rim of the opening 38 in the outer diaphragm resiliently contacts the planar portion 29 of the inner diaphragm, the rim 39 of the opening forming the continuous contact zone surrounding the opening 38 in only the outer diaphragm and not surrounding or overlapping the opening 33 in the inner diaphragm. The resilient engagement of the rim of the opening 38 with the inner diaphragm forms a substantially hermetic seal of the opening 38 to seal the container.

A rolled or folded length 35 of wet wipe material is contained within the dispenser 26. The free end of the wipe to be extracted is compressed and extended through the opening 33 in the inner diaphragm and under the rim 40 of the opening 39 which is completely out of register with the opening 33 to be held thereby in pressure contact with the central planar portion 29 of diaphragm 28. The free end of the length of wipe is then disposed substantially as shown in Figure 10 in the recess formed by the frustoconical wall

UNITED STATES PATENT AND TRADEMARK OFFICE

CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

portion 38 where it can be readily gripped by the user. Wipes may be withdrawn as desired by gripping the free end of the wipe next to be extracted and pulling it away from the dispenser through opening 39.

When a wipe is being withdrawn a portion of the next wipe will be pulled under the rim 40 of opening 39 as a result of resilient deformation of the frustconical portion of diaphragm 36 before the first mentioned wipe tears away, thus rendering the next wipe ready for removal.

Pulling the wipe through the opening 39 in the outer diaphragm tends to cause the frustoconical portion to invert but this risk is reduced because the frustum is that of an oblique cone.

The dispenser 26 is provided with an integral bracket 43 by means of which it may be mounted on vertical surface such as a wall or a door.

UNITED STATES PATENT AND TRADEMARK OFFICE
CERTIFICATE OF CORRECTION

PATENT NO. : 4,601,938

DATED : July 22, 1986

INVENTOR(S) : Deacon et al.

It is certified that error appears in the above—identified patent and that said Letters Patent is hereby corrected as shown below:

Whilst dependent on the thickness and compressibility of the wipe, and the resilience of the diaphragm, the closure described provides an improved sealing of the dispenser to minimise fluid loss by evaporation from the main body of wipe stored therein.

Variants on the design described above are of course possible in which a frustoconical wall portion, resilient --.

Signed and Sealed this

Twenty-fourth Day of February, 1987

*Attest:*

DONALD J. QUIGG

*Attesting Officer* *Commissioner of Patents and Trademarks*